United States Patent
Li et al.

(10) Patent No.: US 7,522,915 B2
(45) Date of Patent: Apr. 21, 2009

(54) METHOD AND APPARATUS TO FACILITATE ALTERNATIVE MODES OF OPERATION FOR A PORTABLE COMMUNICATION DEVICE

(75) Inventors: Yi Q. Li, Skokie, IL (US); Ezzat Dabbish, Cary, IL (US); Thomas S. Messerges, Schaumburg, IL (US); Larry C. Puhl, West Dundee, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/062,642

(22) Filed: Feb. 22, 2005

(65) Prior Publication Data

US 2006/0189304 A1    Aug. 24, 2006

(51) Int. Cl.
*H04M 1/00*    (2006.01)
(52) U.S. Cl. .............. 455/418; 455/556.2; 455/552.1; 455/572; 455/67.11; 455/67.13
(58) Field of Classification Search .............. 455/574, 455/556.1–2, 456.4, 418–420, 425, 67.11, 455/553.1, 572
See application file for complete search history.

(56) References Cited

U.S. PATENT DOCUMENTS

| | | | |
|---|---|---|---|
| 5,444,867 A * | 8/1995 | Marui et al. ............ 455/573 |
| 5,479,480 A * | 12/1995 | Scott ....................... 455/425 |
| 5,627,964 A | 5/1997 | Reynolds et al. | |
| 5,784,549 A | 7/1998 | Reynolds et al. | |
| 5,797,089 A * | 8/1998 | Nguyen .................. 455/403 |
| 5,812,636 A * | 9/1998 | Tseng et al. ............ 455/423 |
| 5,815,407 A | 9/1998 | Huffman et al. | |
| 6,181,916 B1 * | 1/2001 | Mou et al. .............. 455/572 |
| 6,223,032 B1 * | 4/2001 | Cuffaro .................. 422/425 |
| 6,418,309 B1 * | 7/2002 | Moon et al. ............ 455/418 |
| 6,448,906 B1 | 9/2002 | Nachtsheim et al. | |
| 6,535,749 B1 * | 3/2003 | Iwata et al. ............ 455/556.2 |
| 6,560,726 B1 | 5/2003 | Vrhel, Jr. et al. | |
| 6,633,758 B1 * | 10/2003 | Heinonen et al. ........ 455/418 |
| 6,650,894 B1 * | 11/2003 | Berstis et al. ............ 455/420 |
| 6,999,800 B2 * | 2/2006 | Peng et al. .............. 455/574 |
| 7,349,688 B2 * | 3/2008 | Tsuda et al. ............ 455/418 |
| 2002/0077144 A1 | 6/2002 | Keller et al. | |
| 2002/0119788 A1 * | 8/2002 | Parupudi et al. ........ 455/456 |
| 2005/0054372 A1 * | 3/2005 | Tsuda et al. ........... 455/550.1 |
| 2006/0075216 A1 | 4/2006 | Vaha-Sipila et al. | |

OTHER PUBLICATIONS

"A description of the Safe Mode Boot options in Windows XP", Article ID 315222; retrieved from the internet: http://support.microsoft.com/default.aspx?scid=kb;en-us;315222' on Sep. 15, 2005 (2pp).

International Search Report dated Sep. 15, 2006 in connection with International Application No. PCT/US06/01457(3 pages).

Written Opinion of the International Searching Authority dated Sep. 15, 2006 in connection with International Application No. PCT/US06/014571 (7 pages).

* cited by examiner

*Primary Examiner*—Sharad Rampuria

(57) ABSTRACT

A communications device (300) enabled to support both external voice communications functionality (301) (or other external communications of interest and choice) and other functionality (302) has at least a first and second mode of operation (304 and 305). The first mode of operation permits essentially all functionality while the second mode of operation precludes at least much of the other functionality in favor of preserving the viability of at least some of the external communications functionality. A selector (306) can select a given mode of operation based, at least in part, on a trigger 307 comprising, for example, a user input and/or detection of a condition of concern.

9 Claims, 3 Drawing Sheets

METHOD AND APPARATUS TO FACILITATE ALTERNATIVE MODES OF OPERATION FOR A PORTABLE COMMUNICATION DEVICE

TECHNICAL FIELD

This invention relates generally to portable communication devices and more particularly to portable communication devices that also support non-communications related functionality.

BACKGROUND

Two-way communications devices of various kinds are well known in the art. Illustrative devices include, but are not limited to, portable telephony service devices (such as cellular service telephones), portable dispatch and/or push-to-talk service devices, and so forth. In more recent times, a trend towards convergence of functionality has seen a significant increase in the quantity of non-communications functionality being also supported by such devices. Illustrative devices include, but are not limited to, two-way communications devices that also support music storage and playback, image capture, game play, and so forth. In some cases, the percentage of processing capability dedicated at any given moment to non-communications related functionality can actually exceed the platform's allocated support for communications functionality.

This increase in mixed-purpose platforms, while offering numerous benefits to users, also presents certain challenges. One important area of concern involves the operational integrity of the platform itself. Put simply, increased complexity sometimes carries with it an increased number of opportunities for the platform to fail in some manner. Furthermore, in some cases the likelihood of system failure may also increase due to an increased likelihood that a given feature or program offering does not operate fully compatibly with one or more other components of the device. When such failures occur, of course, there is a considerably increased likelihood that the failure will also lead to unavailability of the communications functionality of the device.

In many cases, a temporary (or even a permanent) loss of non-communications functionality for such a device represents an inconvenience but usually does not rise to a higher level of concern. Losing one's ability to wirelessly communicate, however, presents a difference in kind rather than merely one of degree. Losing one's ability to communicate can result in not only inconvenience but can also lead to more troubling circumstances.

BRIEF DESCRIPTION OF THE DRAWINGS

The above needs are at least partially met through provision of the method and apparatus to facilitate alternative modes of operation for a portable communication device described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a portable wireless communications device can be imbued with a first mode of operation wherein use of a first quantity of native functionality is not precluded and a second mode of operation that precludes using at least some of the native functionality while continuing to not preclude use of native functionality as is substantially essential to effecting wireless communications. By one approach, one can automatically select from amongst these modes of operation by detecting a condition of concern. The triggering condition of concern can vary with the needs and/or requirements of a given deployment, with illustrative examples including (but not being limited to):

detection of an occurrence of at least one operational fault;
detection of at least a predetermined number of faulty boot sessions;
detection of a memory abnormality;
detection of abnormal execution behavior; and/or
detection of diminished power capacity.

So configured, a given portable communications device, even though experiencing numerous and/or considerable operational problems (including but not limited to seriously stymied fundamental system activities) can nevertheless continue to provide at least basic communications services. As a result, a given user, though possibly inconvenienced by denied availability of at least some peripheral capabilities, will nevertheless continue to enjoy external communications capability.

Figure 1:
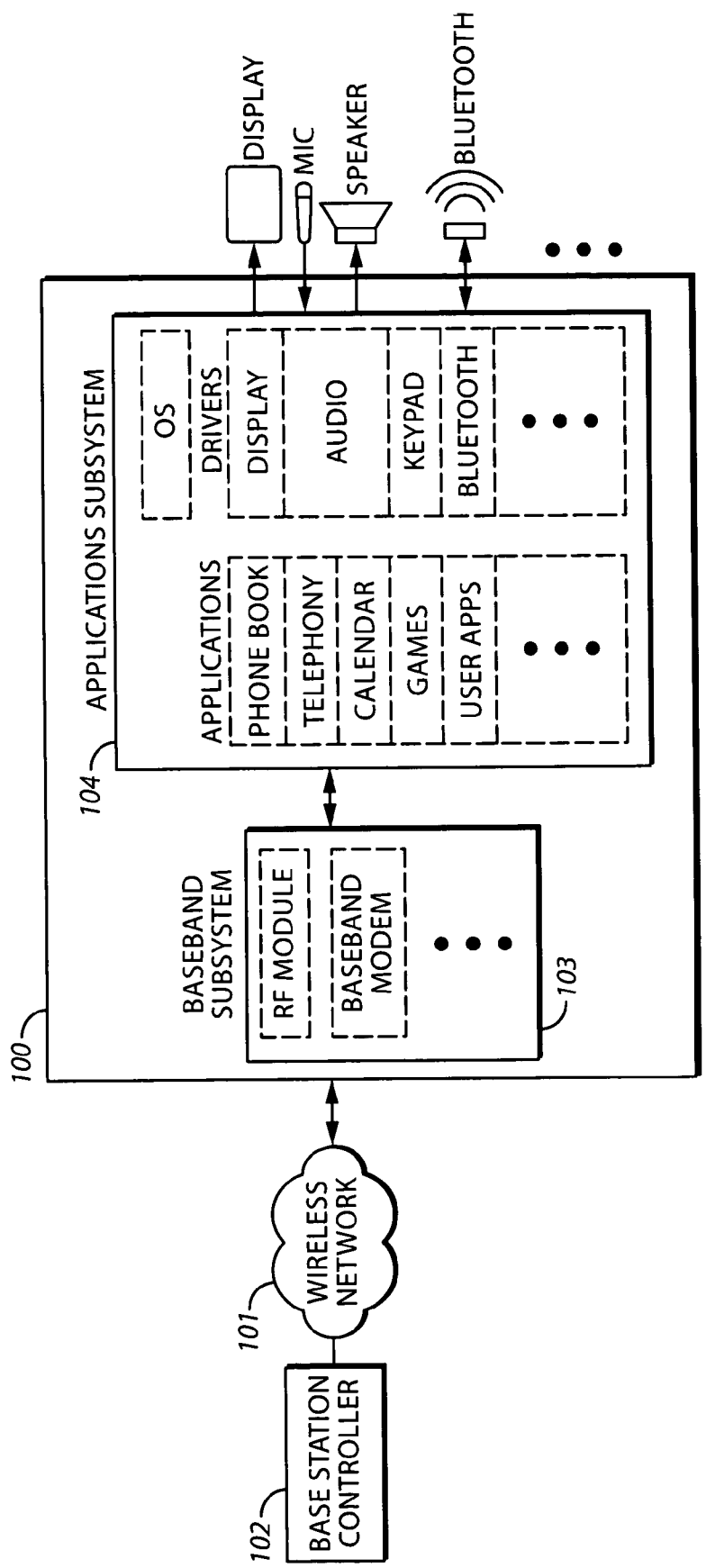
FIG. 1 comprises a block diagram as configured in accordance with the prior art.

These and other benefits may become clearer upon making a thorough review and study of the following detailed description. Referring now to the drawings, and in particular to FIG. 1, it may be helpful to first describe an illustrative example of a multi-function two-way communications device 100 of a type that would benefit from these teachings. This device 100 couples, in this illustrative example, via a wireless wide area network 101 (such as a cellular telephony network) to a base station controller 102 and from there to a communications endpoint of choice (not shown).

The device 100 itself comprises a baseband subsystem 103 and an applications subsystem 104. Those skilled in the art will appreciate that the depicted subsystems 103 and 104 are at least logically separated and may, or may not, be physically parsed depending upon the architectural arrangement used in a given embodiment. The baseband subsystem 103 supports various external communications functions including, but not limited to, a radio frequency (RF) module, a baseband modem, and so forth.

The applications subsystem 104 in turn also supports various applications. Some of these applications may directly correspond to the external communications functionality of the device 100 (for example, a phone book, one or more telephony applications, and so forth) and some may correspond to functions that serve external communications needs while also serving other capabilities as well (for example, an operating system (OS), a display driver, and audio input and output driver, a keypad driver, and so forth).

Yet other applications may have nothing to do with external communications. Such applications can include, for example, a calendar application, games, and so forth.

Pursuant to these teachings, during one mode of operation the device 100 will preferably generally permit the timely and appropriate usage of any of these functions and subsystems. During another mode of operation, however, at least some (and preferably all) of the functions and/or subsystems that are not related, directly or indirectly, to the facilitation of external communications are rendered unavailable. So configured, should some non-communications functionality of the device 100 become inoperable and/or erratic, such problems may nevertheless not prevent a user from using the device 100 to effect an external communication via, in this example, the wide area wireless network 101.

Figure 2:
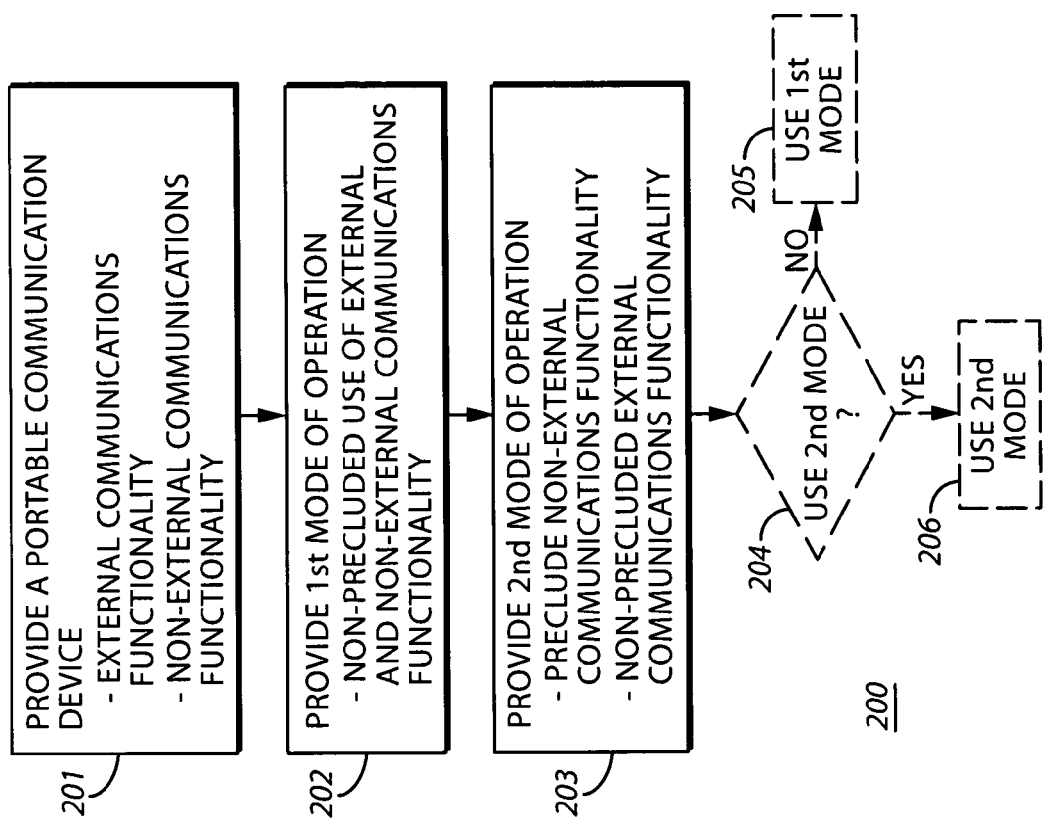
FIG. 2 comprises a flow diagram as configured in accordance with various embodiments of the invention.

Referring now to FIG. 2, a corresponding process 200 will be described. (Those skilled in the art will recognize that the order of the steps presented is not necessarily critical in many instances and they will further recognize that many of these steps may be combined with one another in various ways as well if desired.) This process 200 contemplates provision 201 of a portable communication device having both external communications functionality and non-external communications functionality. In an exemplary embodiment the external communications functionality comprises, at least in part, functionality as corresponds to compatible interaction with a wide area network such as but not limited to a cellular telephony network.

The non-external communications functionality can comprise any of a wide variety of presently known (or hereafter developed) features and capabilities. A non-exhaustive listing might include:

- personal digital assistant functionality (including but not limited to a variety of desktop-styled applications such as word processing, spreadsheet support, database interfacing, and so forth);
- Java-based application functionality;
- location aware functionality (including but not limited to navigation, location-based messaging and advertising, and so forth);
- informational resource functionality (including but not limited to reference works such as encyclopedias, dictionaries and thesauruses, recipes, and so forth);
- text-based entertainment functionality (including but not limited to so-called e-books and the like);
- financial services functionality (including but not limited to expense record keeping, electronic wallet and proximity payment services, and the like);
- visual entertainment functionality (including but not limited to image displays and the like);
- audio entertainment functionality (including but not limited to pre-recorded works, recording functionality, and so forth);
- multi-media entertainment functionality (including but not limited to games, movies, and the like); and
- image capture functionality;

to name but a few.

This process 200 then provides 202 for a first mode of operation while also providing 203 for a second mode of operation. In a preferred approach the first mode of operation does not preclude use of either the external or non-external communications functionality of the portable communication device. The second mode of operation, however, preferably precludes use of at least some of the non-external communications functionality while not precluding use of the external communications functionality. In particular, in a preferred approach, this second mode of operation does not preclude use of at least some external communications functionality that is required to effect compatible interaction with, for example, a wide area network such as a cellular telephony system.

So configured, a portable communications device can use such modes of operation to permit external communications even when platform-threatening conditions exist. To facilitate such benefits, and with continued reference to FIG. 2, this process 200 can further optionally, but preferably, make a determination 204 regarding whether to use the second mode of operation. This, in turn, permits the process 200 to determine either to use 205 the first mode of operation or to use 206 the second mode of operation.

This decision 204 can be based upon any of a wide variety of triggering instances. As one example, the portable communication device can be configured with a user interface to permit a user to input an instruction indicating that the second mode of operation is to be used. In such a case, this decision 204 can be based upon detection of that instruction.

As another example, the decision 204 can comprise an automated determination. For example, and pursuant to a preferred approach, the decision 204 to use the second mode of operation can comprise an automatic determination based upon detection of some condition of concern. A non-exhaustive listing of illustrative conditions might comprise:

- detection of an occurrence of at least one operational fault;
- detection of at least a predetermined number of faulty boot sessions;
- detection of a memory abnormality;
- detection of abnormal execution behavior (as might be induced, for example, by a virus or virus-like program); or
- detection of diminished power capacity (to complement, for example, a given power management capability of a given device);

to name a few.

And as yet another example, this decision regarding whether to employ the first or the second modes of operation can comprise a combination of automated and user-effected instructions. To illustrate, upon detecting a condition of concern (such as one of the conditions enumerated above) the process could automatically provide an opportunity to the user to select the second mode of operation (such as by triggering an alert tone to attract the attention of the user and by providing a written notice regarding this selectable option on a display). Pursuant to such an approach, in the absence of a specific instruction from the user the second mode of operation would not be engaged.

Those skilled in the art will also appreciate that the above illustrative options can be further combined and mixed with one another. For example, some conditions of concern might simply trigger an opportunity for the user to instigate the second mode of operation while other conditions of concern (such as, for example, more serious instances) might automatically trigger use of the second mode of operation without also requiring user acquiescence.

So configured, a corresponding device, upon powering up and determining to use the first mode of operation, can initialize its operating system and all drivers and services. User configurations and settings can then be loaded and applications auto-launched in accordance with ordinary preferences. More particularly, these actions can be effected for all subsystems and functionality (including communications and applications functionality). Upon powering up, however, and determining to use the second mode of operation, this same device can initialize, for example, a minimal operating system configuration while also initializing only those basic input/output drivers and telephony-related services as correspond to the external communications capability to be preserved. If desired, factory default settings might be loaded instead of user-selected configurations and settings to again further aid in preserving the likely operability of the device as a communications platform.

Figure 3:
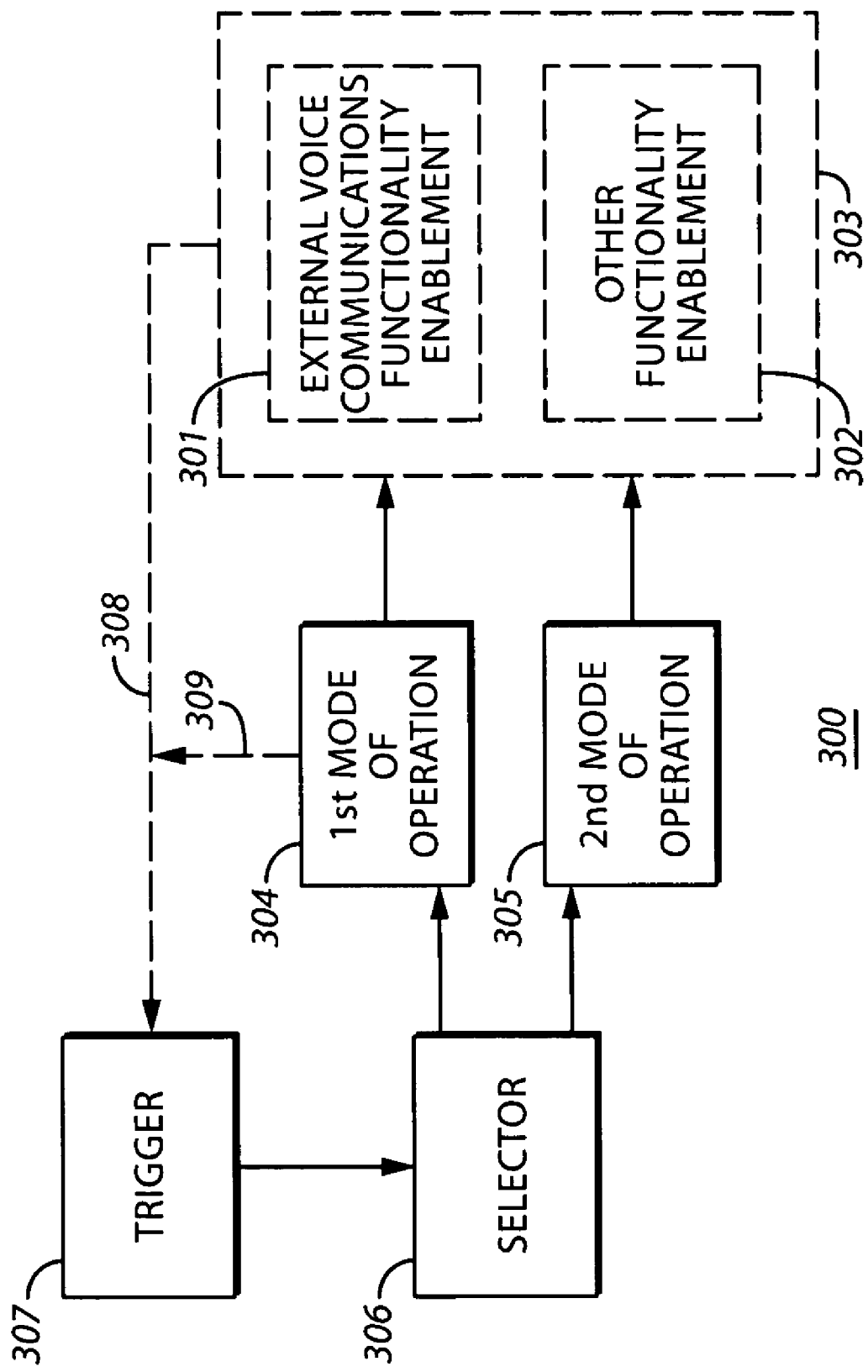
FIG. 3 comprises a block diagram as configured in accordance with various embodiments of the invention.

These teachings can be implemented in various ways with FIG. 3 providing an illustrative logical view. Pursuant to these teachings a portable wireless communications platform (such as a one-way or two-way communications device) 300 has at least one logically partitioned component 301 that enables external voice communications functionality and at least one other logically partitioned component 302 that enables other functionality. These logically partitioned components may be physically separated or may share a common enabling platform 303 depending upon the needs and/or capabilities of a given device as will be well understood by those skilled in the art.

In accordance with the earlier-provided description this platform 300 also has a first mode of operation 304 and a second mode of operation 305. The first mode of operation 304 preferably enables use of both the component 301 that enables the external voice communications functionality and the component 302 that enables the other functionality. The second mode of operation 305 preferably enables use of the component 301 that enables the external voice communications functionality while precluding use of at least portions and possibly all of the component 302 that enables the other functionality.

A selector 306 provides an output signal that comprises a selection as between the first and the second mode of operation and hence controls the mode of operation of the platform 300. In a preferred approach this selector 306 responds to a trigger 307. As described above, this trigger 307 can comprise a user-assertable input if desired, or can comprise detection of a condition of concern with respect to the (past, present, and/or future) operating integrity of the portable wireless communications platform 300. As to the latter, the trigger 307 can be based, for example, upon input 309 as corresponds to effectuation of the first mode of operation 304 and/or upon input 308 as corresponds to the operation (and/or operability) of one or both of the above-described components 301 and 302. So configured, the trigger 307 can comprise a mechanism for detecting a condition of concern with respect to the operating integrity of the portable wireless communications platform 300 and for effecting (or at least influencing) selection of, for example, the second mode of operation 305.

So configured, those skilled in the art will appreciate that a communications device that also supports other kinds of functionality can more likely continue to provide at least rudimentary communications capability even when experiencing impaired operating circumstances (including operating circumstances that might otherwise limit or prohibit such availability). These benefits can be achieved using automated, partially automated, or non-automated selection of a reduced set of operating capabilities that are selected to increase the likelihood that such communications remain viably available.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one example, a given device may include a variety of external communications capabilities. For instance, in addition to wide area network compatibility, a given device might also be Bluetooth capable, wireless local area network capable, infrared capable, and so forth. In such a case, the second mode of operation may, in addition to precluding operation of at least some non-external communications functionality may also preclude operation of some, but not all, of the external communications functionality. For example, when deployed with a Bluetooth capable cellphone it may be appropriate to preclude the Bluetooth functionality while preserving the wide area network capabilities of the cellphone when characterizing the second mode of operation.

We claim:

1. A method comprising:
   providing a portable communication device that includes a communications platform having wireless communications functionality and additional functionality other than wireless communications functionality;
   providing a first mode of operation wherein use of the wireless communications functionality and the additional functionality is not precluded;
   providing a second mode of operation wherein at least some use of the wireless communications functionality is not precluded and at least some use of the additional functionality is precluded;
   automatically determining to use the second mode of operation upon detecting a condition of concern with respect to an operating integrity of the communications platform while using the first mode of operation, wherein detecting a condition of concern and automatically determining to use the second mode of operation are done internal to the portable communication device;
   wherein detecting a condition of concern further comprises detecting at least one of:
      an occurrence of at least one operational fault;
      at least a predetermined number of faulty boot sessions;
      a memory abnormality; and
      abnormal execution behavior inducible by at least one of a virus and a virus-like program.

2. The method of claim 1, wherein the wireless communications functionality comprises, at least in part, functionality as corresponds to compatible interaction with a wide area network.

3. The method of claim 2 wherein the wide area network comprises a cellular telephony network.

4. The method of claim 2, wherein providing a second mode of operation further comprises not precluding use of wireless communications functionality as is required to effect compatible interaction with the wide area network.

5. The method of claim 1, wherein the additional functionality comprises, at least in part, functionality as corresponds to at least one of:
   personal digital assistant functionality;
   Java-based application functionality;
   location aware functionality;
   informational resource functionality;
   text-based entertainment functionality;
   financial services functionality;
   visual entertainment functionality;
   audio entertainment functionality;
   multi-media entertainment functionality; and
   image capture functionality.

6. A portable wireless communications platform having voice communications functionality and other functionality, the portable wireless communications platform comprising:

at least one at least logically partitioned component that enables the voice communications functionality;

at least one at least logically partitioned component that enables the other functionality;

a faulty operation trigger, wherein the faulty operation trigger is internal to the portable wireless communications platform and is operable to automatically detect a condition of concern with respect to an operating integrity of the wireless communications platform;

a first mode of operation that enables use of both the component that enables the voice communication functionality and the component that enables the other functionality;

a second mode of operation that enables use of the component that enables the voice communication functionality while precluding use of the component that enables the other functionality; and a selector that is responsive to the faulty operation trigger and that provides an output signal comprising a selection of the second mode modes of operation when the faulty operation trigger detects a condition of concern during operation of the first mode of operation, wherein the selection is done internal to the portable wireless communications platform;

wherein the faulty operation trigger detects at least one of:
an occurrence of at least one operational fault;
at least a predetermined number of faulty boot sessions;
a memory abnormality; and
abnormal execution behavior inducible by at least one of a virus and a virus-like program.

7. The portable wireless communications platform of claim 6, wherein the voice communications functionality comprises a wide area network communications functionality.

8. A method for use in a portable wireless communications device, the method comprising:
providing a first mode of operation wherein use of a first quantity of native functionality is not precluded;
providing a second mode of operation that precludes using at least some of the native functionality while continuing to not preclude use of native functionality as is substantially essential to effecting wireless communications;
automatically detecting a condition of concern with respect to at an operating integrity of a communications platform of the portable wireless communications device when using the first mode of operation; and
in response to detecting a condition of concern, automatically selecting the second mode of operation, wherein automatically selecting the second mode of operation is done internal to the portable wireless communications device;
wherein detecting a condition of concern further comprises detecting at least one of:
an occurrence of at least one operational fault;
at least a predetermined number of faulty boot sessions;
a memory abnormality; and
abnormal execution behavior inducible by at least one of a virus and a virus-like program.

9. The method of claim 8, wherein the wireless communications comprise wireless voice telephony services.

* * * * *